Feb. 6, 1962 W. B. McKNIGHT ETAL 3,020,414
SCANNING MIRROR ASSEMBLY
Filed July 5, 1960

William B. McKnight
Lonnie N. McClusky
Gene H. Widenhofer,
INVENTORS.

BY
S. J. Rotondi
A. P. Dupont
C. A. Phillips
ATTORNEYS.

United States Patent Office 3,020,414
Patented Feb. 6, 1962

3,020,414
SCANNING MIRROR ASSEMBLY
William B. McKnight, Summerville, Lonnie N. McClusky, Toney, and Gene H. Widenhofer, Huntsville, Ala., assignors to the United States of America as represented by the Secretary of the Army
Filed July 5, 1960, Ser. No. 40,978
6 Claims. (Cl. 250—235)
(Granted under Title 35, U.S. Code (1952), sec. 266)

The invention described herein may be manufactured and used by or for the Government for governmental purposes without the payment of any royalty thereon.

This invention relates principally to scanning devices, and more particularly to an electromagnetically driven optical scanning device.

The detection and imaging of objects which radiate in wavelengths too low for the human eye to detect has long been a problem of concern. In the present time, in view of the usefulness of such wavelengths to detect missiles and aircraft, the need for new detection devices to utilize these wavelengths becomes more urgent. One of the greatest obstacles to the perfection of a workable low frequency radiation imaging system is that of obtaining a simple, reliable method of scanning a field of view. Conventional mechanical systems tend to be slow, subject to excessive and rapid wear of moving parts, and to be subject to nonlinear scanning conditions due to excessive mass.

Therefore, it is a purpose of this invention to provide an improved scanning device which is capable of a very rapid scan and has a minimum of moving parts.

In accordance with features of the invention a scanning mirror assembly is constructed in which a mirror is vibrated about an axis by an electromagnetic drive and the mirror is mechanically linked to a mechanical electrical transducer which in turn provides an electrical signal that controls the vibration rate of the electromagnetic drive.

In one form of the invention the electrical drive consists of a pair of differentially energized electromagnets positioned symmetrically with respect to the axis of mirror vibration and the mirror is constructed of a material which is attracted by a magnetic force. An auxiliary magnet, or electromagnet, is positioned in a balanced relation with respect to the mirror to produce a magnetic bias in order to produce differential magnetic forces between the drive electromagnets and the mirror. In accordance with another feature of the invention the mirror is attached to and rotated about a torsion rod or wire which is coupled to an electrical transducer. As a further aspect of the invention the scanning assembly is combined and aligned with optical focusing means which focuses a radiation beam on a photosensitive detector which receives reflected radiation from the mirror. The combination provides an excellent contrast type radiometer. In the presence of a target, an A.C. signal is generated by the detector by virtue of relative motion of the field of view across the detector (due to vibration of the mirror) producing a comparison of a portion of the background without target to a portion which includes the target. This results in a signal which is proportional to the target intensity above the background replaced by the target.

This invention will be better understood and its novelty more fully appreciated by reference to the following specification, and the drawings in which.

Figure 1:
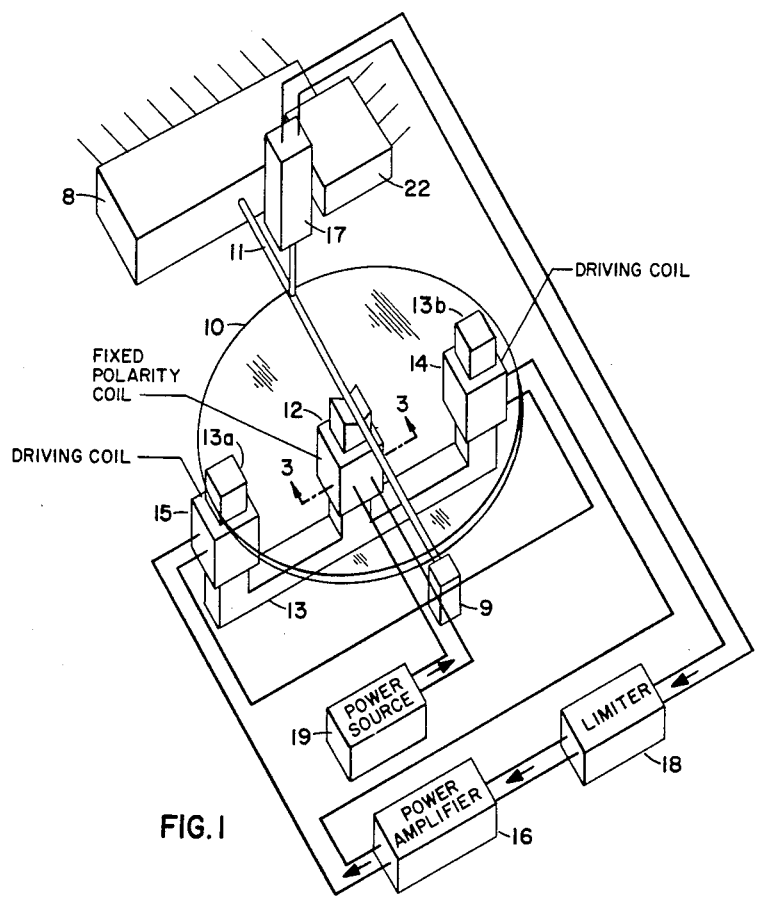
FIGURE 1 is a pictorial-block diagram of an embodiment of a vibrating mirror system constructed in accordance with the inventtion.
Figure 3:
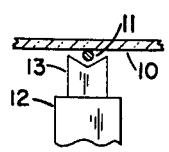
FIGURE 3 shows a sectional view along the line 3—3 of FIGURE 1.

Referring to FIGURE 1 there is shown a mirror 10 fastened to a torsion rod or wire 11. This torsion member is held fast at one end by supporting member 8 and held at the opposite end by bearing 9. It is positioned adjacent to the end of the center pole piece of E shaped magnetic core 13. This is illustrated in detail in FIGURE 3. Around the center pole piece of E core 13 is an electromagnetic coil 12 to which is applied a unidirectional bias from power source 19. Mirror 10 extends equally over the extreme ends 13a and 13b of E shaped core 13, and as the mirror and torsion rod are constructed of a magnetic material magnetic forces are produced between the mirror and the respective core ends which are equal and thus establish a magnetic field against which coils 14 and 15 work to produce push-pull driving forces. Coils 14 and 15 are driven differentially by the output of amplifier 16. The input of amplifier 16 is coupled thru amplitude limiter 18 to the output of transducer 17 which has an input ccupling to torsion member 11. Transducer 17 is attached to a fixed mount 22. The coupling of the circuit members are arranged to provide positive feedback and thus provoke oscillation. The frequency of oscillation is determined by the mass of the mirror 10 and stiffness of the torsion member 11, the mirror oscillating about the axis provided by the torsion member 11 and bearing 9.

The torsion bar type suspension as magnetically driven provides a constant amplitude oscillation approaching a pure sine wave, and causes little wear.

Figure 2:
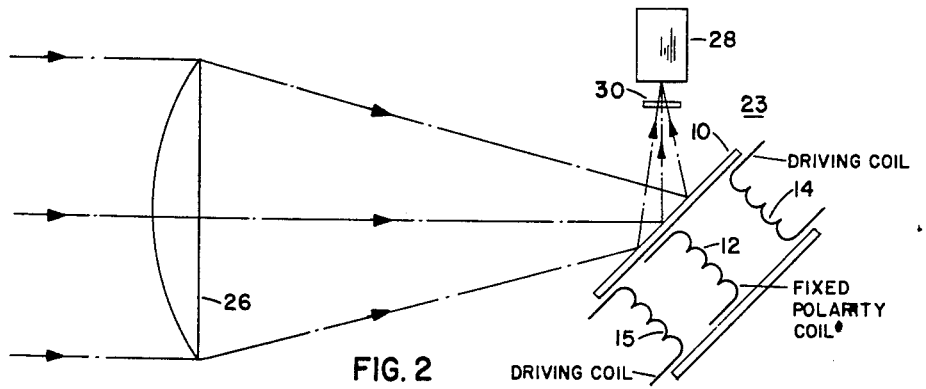
FIGURE 2 shows a radiometer embodying the invention.

FIGURE 2 shows a radiometer consisting of vibrating mirror assembly 23 ( a brief representation of FIGURE 1), lens 26, radiation detector 28 and filter 30. Lens 26 is positioned to focus radiation on the detector 28 thru vibrating mirror assembly 23 and infrarared filter 30. The mirror 10 is oriented 45° with respect to incident and reflected radiation.

In operation with mirror 10 oscillating about torsion rod 11, assume that one range of mirror positions an infrared target, appearing on a predominately blue background, is projected by mirror 10 thru filter 30 to detector 28. During the remainder of the mirror scan cycle only the background radiation is reflected toward detector 28 and most of it is blocked by filter 30 from reaching the detector. Detector 28 then provides an A.C. output which varies in magnitude in proportion to the difference between detected target intensity and detached background intensity, which in this instance would be significant. In this manner an infrared target may be readily detected.

It can be seen that this device has many applications, and it is equally obvious that there are a number of different designs possible, which, nonetheless do not depart from the spirit of the invention, wherefore it is desired that the following claims not be restricted by the specific examples set forth in these specifications.

Therefore what is claimed as new and it is desired to be secured by Letters Patent of the United States is:

We claim:

1. A scanning mirror assembly comprising a mirror, electrical drive means coupled to said mirror for causing said mirror to vibrate about an axis, mechanical to electrical transducer means, the mechanical input of said transducers means being linked to said mirror, the electrical output of said transduced means being connected to the input of said electrical drive means, and said electrical drive means comprising means responsive to the electrical output of said transducer means for controlling the frequency of vibration of said mirror.

2. A scanning mirror assembly comprising: a paramagnetic plate having a mirrored surface; means attached to said plate for providing an axis of vibration; electromagnetic means magnetically coupled to said plate for positioning said plate about said axis; driving means electrically coupled to said electromagnetic means for causing said electromagnetic means to recurrently vary said position of said plate; a mechanical-electrical transducer mechanically responsive to movement of said plate for producing an electrical output corresponding to movement of said plate; said driving means comprising an electrical amplifier and regenerative means comprising means for regeneratively coupling said electrical output to the input of said amplifier and the output of said amplifier to an input of said electromagnetic means to cause self controlled oscillatory plate movement.

3. The assembly set forth in claim 2 wherein said means for providing an axis comprises a torsion rod and a fixed mounting means, one end of said rod being held by said mounting means and the other end of said rod attached to and supporting said plate, said rod being adapted for twisting movement between said rod ends responsive to said movement of said plate.

4. The assembly set forth in claim 3 wherein said magnetic means comprises first and second electromagnets, said electromagnets being positioned on each side of said axis and adapted to apply equal twisting torque thru said plates to said rod, unidirectional magnetic biasing means magnetically coupled to said plate, said unidirectional biasing means being positioned with respect to said plate to equally magnetically oppose the flux introduced into said plate by one of said electromagnets and aid the flux introduced into said plate by the other said electromagnet when said electromagnets produce opposite fluxes with respect to said plate.

5. The assembly set forth in claim 4 wherein said magnetic means comprises an E shaped magnetic core, said electromagnets comprising windings on outer legs of said core and said unidirectional biasing means comprises a winding on the center leg of said core, the extreme ends of said E core being positioned parallel with and equally spaced with respect to said plate when said electromagnets are unenergized, the open face of said center core being positioned adjacent said axis and the long dimension of said E core being perpendicular to a plane thru said axis.

6. The assembly set forth in claim 3 further comprising a radiation collection lens and a radiation detector, said mirror surfaced plate being oriented at a first angle of 45° with respect to the optical axis of said lens and at a second angle of 45° with respect to the optical axis of said radiation detector, said angles being measured with respect to rotation about said axis of said torsion rod, said optical axes of said lens and radiation detector differing by 90°, said 45° angles being measured with said magnetic means unenergized.

References Cited in the file of this patent
UNITED STATES PATENTS

| | | |
|---|---|---|
| 2,702,494 | Lieneweg et al. | Feb. 22, 1955 |
| 2,946,879 | Powers | July 26, 1960 |
| 2,957,386 | Robinson | Oct. 25, 1960 |
| 2,958,786 | Millis | Nov. 1, 1960 |